United States Patent [19]

Oota et al.

[11] Patent Number: 4,886,382
[45] Date of Patent: Dec. 12, 1989

[54] PRINTING HAMMER COMPRISING TWO HINGE PARTS COUPLING AN ARM TO A BASE MEMBER ON BOTH SIDES OF A HINGE COUPLING THE ARM TO A PIEZOELECTRIC ACTUATOR

[75] Inventors: Takashi Oota; Tadao Uchikawa, both of Tokyo, Japan

[73] Assignee: NEC Corporation, Tokyo, Japan

[21] Appl. No.: 153,371

[22] Filed: Feb. 8, 1988

[30] Foreign Application Priority Data

| Feb. 9, 1987 | [JP] | Japan | 62-28534 |
| Feb. 9, 1987 | [JP] | Japan | 62-28535 |
| Mar. 6, 1987 | [JP] | Japan | 62-52326 |
| Mar. 6, 1987 | [JP] | Japan | 62-52327 |
| Aug. 31, 1987 | [JP] | Japan | 62-218235 |
| Aug. 31, 1987 | [JP] | Japan | 62-218236 |

[51] Int. Cl.$^4$ .............................................. B41J 3/12
[52] U.S. Cl. .................... 400/124; 101/93.05; 310/328
[58] Field of Search .............. 101/93.05; 400/124; 310/323, 328, 329; 29/592 R, 428, 462

[56] References Cited

U.S. PATENT DOCUMENTS

| 3,955,049 | 5/1976 | MacNeil | 400/124 X |
| 4,435,666 | 3/1984 | Fukui | 310/329 X |
| 4,547,086 | 10/1985 | Matsumoto | 400/124 |
| 4,644,213 | 2/1987 | Shibuya | 310/328 |

Primary Examiner—Paul T. Sewell
Attorney, Agent, or Firm—Sughrue, Mion, Zinn, Macpeak & Seas

[57] ABSTRACT

In a printing hammer which is for use in a printer head and comprises a piezoelectric actuator (16) coupled to a base member (15) by a resilient coupler (23), an arm (19) carrying a printing wire (26), and a first resilient hinge (21) coupling the piezoelectric actuator to the arm, first and second resilient parts (221, 222) are used collectively as a second resilient hinge which couples the arm to the base member. The first and the second resilient parts are both sides of the first resilient hinge on a single plane which has a step of a predetermined size relative to the first resilient hinge in a direction of its thickness. The piezoelectric actuator may be fixed directly to the base member in order to give the printing hammer a high printing speed. Preferably, the first resilient hinge and the first and the second resilient parts are manufactured separately of the arm and/or the base member and brazed in grooves formed in a thick arm end with a spacing of the predetermined size, in a groove formed in an actuator block of the piezoelectric actuator, and in grooves formed in a pair of side legs of the base member. The first resilient hinge may have a T form with the top stroke of the T form brazed in the groove. The first and the second resilient parts may be both branches of a U form.

14 Claims, 4 Drawing Sheets

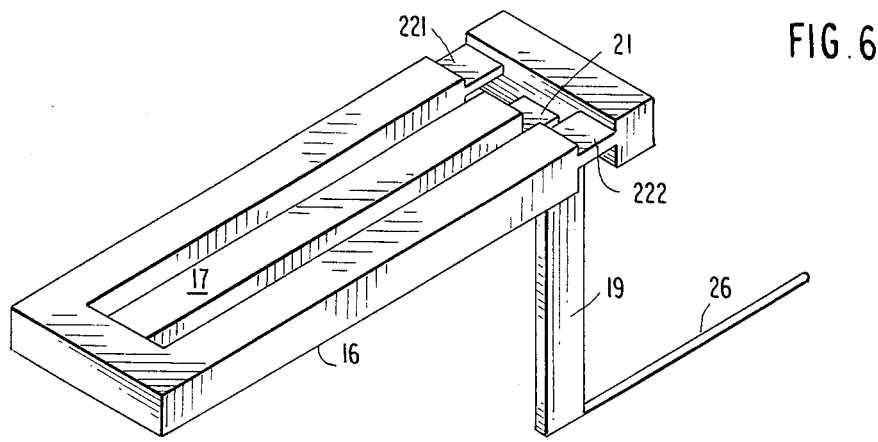
FIG. 6
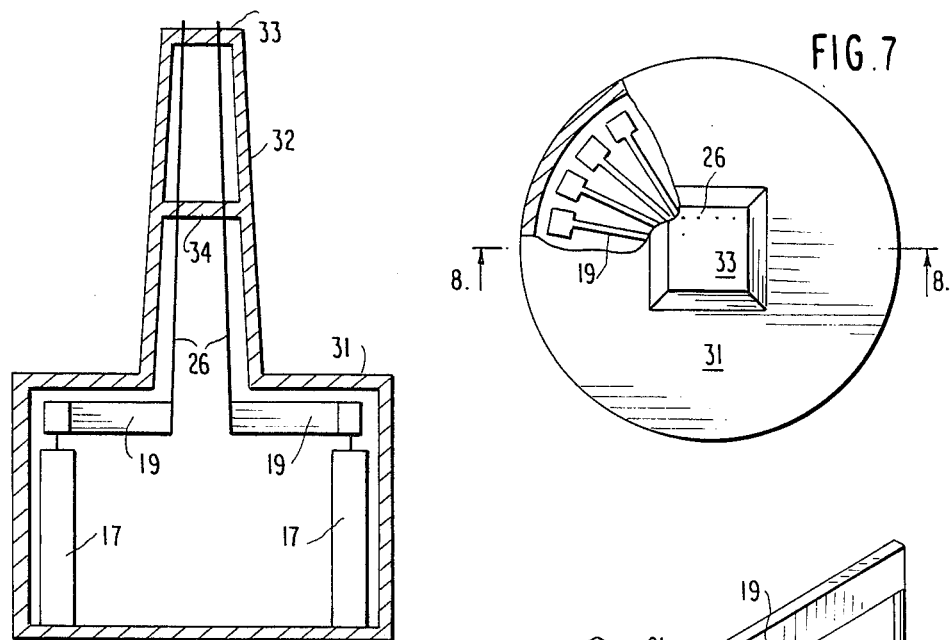
FIG. 7
FIG. 8
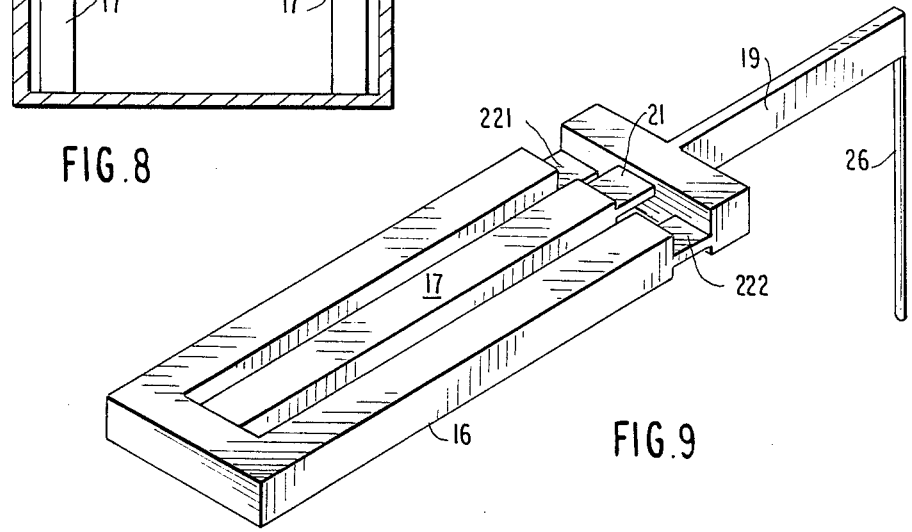
FIG. 9

PRINTING HAMMER COMPRISING TWO HINGE PARTS COUPLING AN ARM TO A BASE MEMBER ON BOTH SIDES OF A HINGE COUPLING THE ARM TO A PIEZOELECTRIC ACTUATOR

BACKGROUND OF THE INVENTION

This invention relates to a printing hammer which is for use in a printer head of a printer of the type known as a serial printer in the art and which comprises a piezoelectric actuator or driver operable in a longitudinal mode of extension and contraction.

In the manner which will later be described a little more in detail, such a printing hammer is disclosed in U.S. Pat. No. 4,435,666 issued to Izumu Fukui et al and assigned to the present assignee which was formerly called Nippon Electric Co., Ltd., in English. According to one of various embodiments of the Fukui et al patent, the printing hammer comprises (a) a base member, (b) a piezoelectric actuator having a base end, a free end, and an actuator axis passing through the base and the free ends and having a rest state and an actuated state of extending and contracting along the actuator axis to give a displacement to the free end relative to the base end, (c) an arm having a first line, a second line parallel to the first line, and an end point, (d) a coupler coupling the base end to the base member, (e) a first resilient hinge coupling the free end to the first line, and (f) a second resilient hinge coupling the second line to the base member. The first line serves as a fulcrum of a lever. The second line serves as a power point or point of application. The end point serves as a weight point.

Although not illustrated in the Fukui et al patent in connection with this embodiment, a printing wire or element is fixed to the end point as a load of the lever. In a few other embodiments of the Fukui et al patent, the base end of the piezoelectric actuator is fixed directly to the base member. In any event, the arm is used in transmitting with amplification or enlargement the displacement of the free end of the piezoelectric actuator to the printing wire.

In the above-referenced one embodiment, the first and the second resilient hinges are disposed on both sides of the arm. It has now been confirmed by the present applicants that this arrangement of the hinges relative to the arm results in an energy loss, namely, in an undue consumption of the energy of extension of the piezoelectric actuator.

In a different embodiment of the Fukui et al patent, the first and the second resilient hinges are arranged on only one side of the arm to be parallel when the piezoelectric actuator is in the rest state. It has been confirmed by the instant applicants that this arrangement of the hinges is excellent in avoiding the energy loss. It is, however, inevitable with this embodiment that the printing hammer has a poor amplification factor for the displacement of the free end of the piezoelectric actuator in contrast to the first-described embodiment because of impossibility of disposing the power point adjacent to the fulcrum.

According to several other embodiments of the Fukui et al patent, the displacement of the free end is transmitted to the printing wire with a two-stage amplification by using two levers in series. Due to the two-stage amplification, the displacement amplification factor is excellent despite the fact that the first and the second resilient hinges are disposed on one side of the arm to be parallel when the piezoelectric actuator is in the rest state. It has, however, been confirmed by the instant applicants that the printing hammer is not operable at a high printing speed.

SUMMARY OF THE INVENTION

It is therefore an object of the present invention to provide a printing hammer which comprises a piezoelectric actuator operable in a longitudinal mode of extension and contraction and which has little energy loss and yet has a large displacement amplification factor.

It is another object of this invention to provide a printing hammer of the type described, which is operable at a high printing speed.

Other objects of this invention will become clear as the description proceeds.

It is possible on describing the gist of this invention to understand that a printing hammer comprises a base member, a piezoelectric actuator having a base end, a free end, and an actuator axis passing through the base and the free ends and having a rest state and an actuated state of extending and contracting along the actuator axis, an arm having a first line, a second line parallel to the first line, and an end point, a printing wire fixed to the end point, coupling means for coupling the base end to the base member, a first resilient hinge coupling the free end to the first line, and a second resilient hinge coupling the second line to the base member.

According to this invention, the above-understood printing hammer is characterized in that the second resilient hinge comprises a first and a second resilient part which couple the second line to the base member on both sides of the first resilient hinge, and which are on a single plane when the piezoelectric actuator is in the rest state.

BRIEF DESCRIPTION OF THE DRAWING:

FIG. 6 is a schematic perspective view of a printing hammer according to a second embodiment of this invention;

FIG. 7 schematically shows, with a part cut away, a top view of a printer head which comprises a plurality of printing hammers illustrated in FIG. 6;

FIG. 8 is a schematic vertical sectional view taken on line 8—8 of FIG. 7;

FIG. 9 is a schematic perspective view of a printing hammer according to a third embodiment of this invention;

Figure 1:
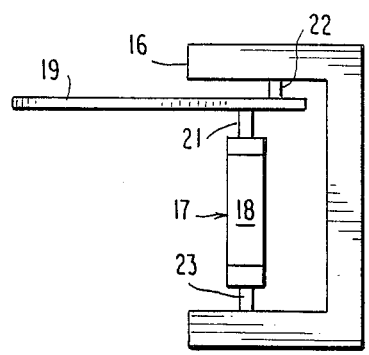
FIG. 1 is a schematic side view of a conventional printing hammer.

DESCRIPTION OF THE PREFERRED EMBODIMENTS:

Referring to FIG. 1, a conventional printing hammer will be described at first in order to facilitate an understanding of the present invention. The conventional printing hammer is one of about twenty embodiments of an invention revealed in U.S. Pat. No. 4,435,666 referred to hereinabove. In the manner known in the art, such a printing hammer is for use in a printer head of the type which will later be illustrated and is used in a printer known as a serial printer in the art.

The conventional printing hammer comprises a base member 16 and a piezoelectric actuator or driver 17 operable in a longitudinal mode. More particularly, the piezoelectric actuator 17 has a base end and a free end depicted downwardly and upwardly of the figure and an actuator axis which passes through the base and the free ends. The piezoelectric actuator 17 is rectangular in cross-section to have a pair of side surfaces on which electrodes are formed. Only one of the electrodes is visible in the figure at 18.

It should be understood that the piezoelectric actuator 17 is depicted in a rest state wherein no voltage is supplied across the electrodes, such as 18. When a voltage is supplied across the electrodes, the piezoelectric actuator 17 is put in an actuated state to extend so that the free end moves away from the base end along the actuator axis. When the voltage is removed, the piezoelectric actuator 17 contracts along the actuator axis to return to the rest state. It is therefore possible to understand that the piezoelectric actuator 17 has the rest and the actuated states in which the piezoelectric actuator 17 extends and contracts along the actuator axis to give a displacement to the free end relative to the base end.

An arm 19 has a first line, a second line parallel to the first line, and an end point depicted leftmost of the figure. In the manner which will presently be illustrated, a printing wire or element is fixed to the arm 19 at the end point.

A first resilient hinge 21 is used in coupling the free end of the piezoelectric actuator 17 to the arm 19 at the first line. A second resilient hinge 22 couples the second line of the arm 19 to the base member 16. In the example being illustrated, the base end of the piezoelectric actuator 17 is coupled to the base member 16 by a resilient coupler 23. Furthermore, it should be noted that the first and the second resilient hinges 21 and 22 are disposed on both or different sides of the arm 19.

When the piezoelectric actuator 17 is put in the actuated state, the end point of the arm 19 moves upwardly of the figure to make the printing wire print a dot on a recording medium (not shown). In this manner, the printing hammer carries out a printing operation. A combination of the arm 19 and the first and the second resilient hinges 21 and 22 serves as a lever with the second line used as a fulcrum and the first line, as a power point or point of application. The lever transmits the displacement of the free end of the piezoelectric actuator 17 to the printing wire with amplification or enlargement. In other words, the lever transmits the displacement to the printing wire with a certain displacement amplification factor or ratio.

The displacement of the free end of the piezoelectric actuator 17 will hereafter be termed an input displacement. The lever transmits the input displacement to the printing wire as an output displacement with the displacement amplification factor. In the hammer known as regards a lever, the piezoelectric actuator 17 imparts an input force to the arm 19. In response, the arm 19 imparts an output force to the printing wire. When the input and the output forces are perpendicular to the arm 19 and have an input force magnitude F and an output force magnitude K, the input force magnitude F is "amplified" into the output force magnitude K by a force amplification factor or ratio which is equal to one by the displacement amplification factor and is less than unity under the circumstances. Incidentally, the displacement amplification factor relates more exactly to an input displacement magnitude X of the input displacement and an output displacement magnitude Y of the output displacement.

Figure 2:
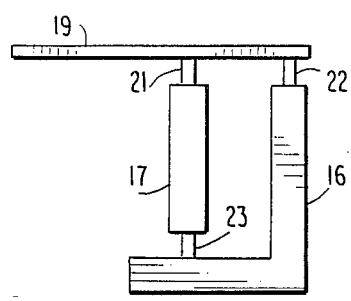
FIG. 2 is a similar view of another conventional printing hammer.

Turning to FIG. 2, another conventional printing hammer comprises similar parts designated by like reference numerals. The printing hammer is according to a different embodiment of the Fukui et al patent. It will be understood in FIG. 2 that the first and the second resilient hinges 21 and 22 are arranged on only one side or the arm 19. The electrodes, such as 18 (FIG. 1), will not be depicted hereafter.

Reviewing FIGS. 1 and 2, attention is now directed by the present applicants to amounts of energy related to the lever. It will be assumed merely for simplicity of description that the arm 19 is rectilinear and that the input and the output displacements and the input and the output forces are parallel and perpendicular to the arm 19. Under the circumstances, the piezoelectric actuator 17 gives an input energy of $XF/2$ to the arm 19. In response, the arm 19 gives an output energy of $YK/2$ to the printing wire. The dot is printed with a thickness or blackness dependent on the output energy.

If the lever were an ideal one, the output energy would be equal to the input energy. The lever, however, transmits in practice the input energy to the printing wire as the output energy with an energy loss, namely, with an undue consumption of the input energy. When the output energy is small, the dot becomes thin, namely, has a poor contrast to its background. In order to get a thick or black dot, it becomes necessary to use a large piezoelectric actuator.

It has now been confirmed by the instant applicants that the output energy is only 5 to 20% of the input energy when the first and the second resilient hinges 21 and 22 are disposed on both sides of the arm 19 and accordingly when the first and the second lines of the arm 19 are on both sides of the arm 19. Main reasons for the energy loss are as follows. At first, each of the first and the second resilient hinges 21 and 22 is deformed into an S shape to unduly consume the input energy when the piezoelectric actuator 17 is put in the actuated state. Secondly, the arm 19 is subjected to an intricate deformation between the first and the second lines and near thereto to additionally unduly consume the input energy when the piezoelectric actuator 17 is put in the actuated state. The deformation of the arm 19 is unavoidable due to an angle formed between the arm 19 and a plane which passes through the first and the second lines.

It is possible to reduce the deformation by using an arm which is thick perpendicularly of the first and the second resilient hinges 21 and 22. Such a thick arm is heavy. This results in an additional undue consumption of the input energy and moreover in making the lever and consequently the printing hammer have a low response frequency to the printing operation. In other words, the printing hammer has a low printing speed. Besides giving rise to the deformation, the angle is objectionable in adjacently disposing the first and the second resilient hinges 21 and 22 because the arm 19 has an arm thickness shown in the figure.

When the first and the second resilient hinges 21 and 22 are disposed on only one side of the arm 19 so that the first and the second lines of the arm 19 are also on one side of the arm 19, each of the first and the second resilient hinges 21 and 22 is not deformed into the S shape but into a C shape or into a shape of an opening or a closing parenthesis. This astonishingly reduces the undue consumption of the input energy. Furthermore, it is possible to make the arm 19 have a thin thickness perpendicularly of the first and the second resilient hinges 21 and 22 because the arm 19 is parallel to a plane which includes the first and the second lines. This further reduces the undue consumption. As a consequence, the printing hammer of FIG. 2 is preferred as regards the energy loss to the printing hammer illustrated with reference to FIG. 1.

It is, however, impossible with the printing hammer illustrated with reference to FIG. 2 to adjacently dispose the first and the second lines and consequently the first and the second resilient hinges 21 and 22 and thereby to make the lever have a large displacement amplification factor. The arm 19 must therefore be long enough in order to get a sufficient stroke of the printing wire for the printing operation and must be undesiredly heavy despite its thin thickness. As a result, the printing hammer has a low response frequency to be operable only at a low printing speed.

Figure 3:
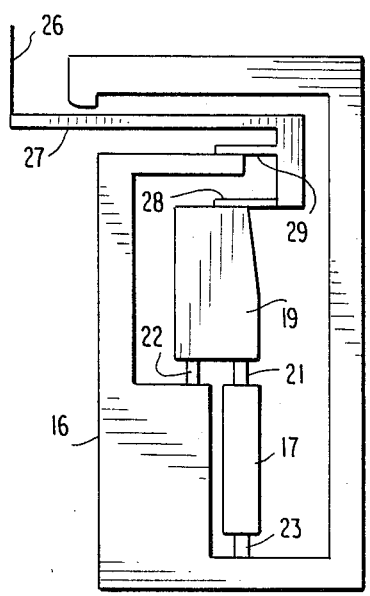
FIG. 3 is a like view of still another conventional printing hammer.

Further turning to FIG. 3, still another conventional printing hammer is according to one of several other embodiments of the Fukui et al patent. In addition to similar parts which are designated by like reference numerals and among which the arm 19 is now called a first arm with the end point named a first end point, the printing wire or element is depicted at 26. A second arm 27 has a third line, a fourth line parallel to the third line, and a second end point at which the printing wire 26 is fixed to the second arm 27. A third resilient hinge 28 couples the first end point to the third line. A fourth resilient hinge 29 couples the fourth line to the base member 16.

It will readily be understood in FIG. 3 that the printing hammer comprises the first and the second resilient hinges 21 and 22 on only one side of the first arm 19 and the third and the fourth resilient hinges 28 and 29 also on one side of the second arm 27 and that the input displacement is eventually transmitted to the printing wire 26 with a two-stage amplification or enlargement by the use of a composite two-stage lever mechanism which consists of a first lever comprising the first arm 19 and a second lever comprising the second arm 27. The first and the second levers are used in series. Under the circumstances, it may apparently be possible to reduce the undue consumption of the input energy and yet to achieve a large displacement amplification factor.

The fact is, however, that the use of the first and the second levers in series results in a bulky printing hammer which is moreover complicated in structure and costly to manufacture. The lever mechanism has a heavy total mass which results, in turn, in an objectionable energy loss. Furthermore, it has been confirmed by the present applicants that the third and the fourth resilient hinges 28 and 29 must have a smaller flexural rigidity than the first and the second resilient hinges 21 and 22 because the output force of the first lever is weaker than the input force. As a result of the small flexural rigidity, the second lever has a low natural frequency and therefore a low response frequency to the printing operation. After all, the printing hammer can not be operable at a high printing speed.

Figure 5:
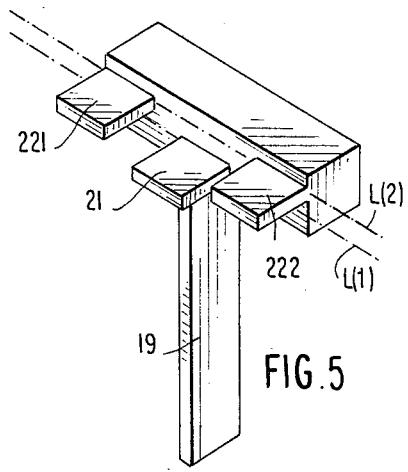
FIG. 5 is a schematic perspective view of a part of the printing hammer shown in FIG. 4.
Figure 4:
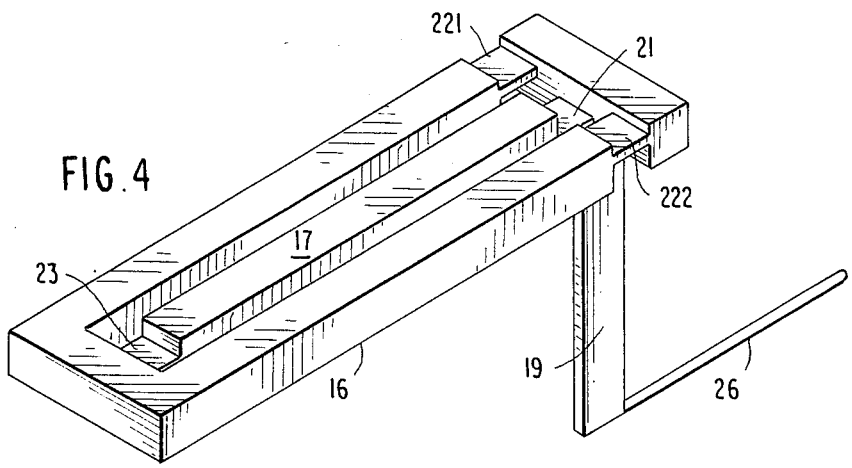
FIG. 4 is a schematic perspective view of a printing hammer according to a first embodiment of the instant invention.

Referring now to FIGS. 4 and 5, the description will proceed to a printing hammer according to a first embodiment of the present invention. The printing hammer comprises similar parts designated by like reference numerals. The first and second lines are indicated at L(1) and L(2) in FIG. 5.

Like the conventional printing hammer illustrated with reference to FIG. 2 heretobefore, the printing hammer comprises only one arm 19 in the manner best shown in FIG. 4. Furthermore, the arm 19 has the first and the second lines on only one side thereof as will presently become clear.

The piezoelectric actuator or driver 17 comprises a piezoelectric element which may be one available on the market, such as a laminated or stacked piezoelectric actuator element manufactured and sold either by NEC Corporation, Tokyo, Japan, or by Tôhoku Kinzohukôgyô KK (Tokin Corporation), Sendai, Japan. Typically, the piezoelectric element has an element height of 20 mm along the actuator axis and a cross-section of a rectangle having an actuator length of 3 mm and an actuator width of 2 mm. The actuator width is oriented parallel to the first and the second lines of the arm 19. The actuator length is therefore orthogonal to the first and the second lines.

A metal actuator block is fixed to one end of the piezoelectric element like in the conventional printing hammers. The actuator block has a surface opposite to the piezoelectric element. It will be presumed that this surface is the free end of the piezoelectric actuator 17. Typically, the actuator block has a block height of 2 mm along the actuator axis and a cross-section which is congruent with that of the piezoelectric element.

In the example being illustrated, the piezoelectric element has another end which is coupled to the base member 16 by the resilient coupler 23 which is used in the conventional printing hammers illustrated with reference to FIGS. 1 through 3. The base member 16 has a pair of side legs on both sides of the piezoelectric actuator 17. The side legs has first and second leg end surfaces which are coplanar with the free end of the piezoelectric actuator 17.

In FIG. 4, the printing wire 26 is fixed to the end point of the arm 19 parallel to the actuator axis and has a wire axis offset relative to the actuator axis. The arm 19 has an arm length traversing the actuator and the wire axes and an arm width and an arm thickness parallel and orthogonal, respectively, to the axes. Inasmuch as the first and the second lines are perpendicular to the arm length, the arm width and the arm thickness are perpendicular and parallel, respectively, to the first and the second lines. By way of example, the arm 19 is made of maraging steel and has the arm length of 14 mm, the arm width of 2 mm, and the arm thickness of 0.3 mm.

In FIGS. 4 and 5, it should be pointed out that the first and the second lines of the arm 19 are adjacently disposed in marked contrast to the first and the second lines described in conjunction with FIG. 2. The first and the second lines have a predetermined spacing therebetween. For the piezoelectric actuator 17 and the arm 19 having dimensions described above as a numerical example, the predetermined spacing is typically 0.7 mm long. Speaking more in general, the predetermined spacing should preferably be equal to or less than a half of the actuator length, which may alternatively be called a predetermined width of the piezoelectric actuator 17.

In order so to dispose the first and the second lines, the arm 19 has a thick end block at an end which is opposite to the end point. The block has a longest measure parallel to the arm thickness and a block surface which is also parallel to the arm thickness and should be directed to the free end of the piezoelectric actuator 17. In the illustrated example wherein the arm length is orthogonal to the actuator and the wire axes, the block surface is parallel to the arm length and is therefore perpendicular to the arm width.

Like in the conventional printing hammer illustrated with reference to FIGS. 1 through 3, the first resilient hinge 21 is used in coupling the free end of the piezoelectric actuator 17 to the first line. In marked contrast to each second resilient hinge 22 which is described in connection with FIGS. 1 through 3 and is used in coupling the second line to the base member 16, first and second resilient parts 221 and 222 are used in FIGS. 4 and 5 in coupling the second line to the base member 16 on both sides of the first resilient hinge 21.

The first and the second resilient parts 221 and 222 are on a single plane with the piezoelectric actuator 17 is in the rest state described before. Inasmuch as the predetermined spacing spaces the first and the second lines, it is understood that the first and the second resilient parts 221 and 22 are in a staggered or juxtaposed relation to the first resilient hinge 21. In any event, it is possible to understand that the second resilient hinge 22 of the known type comprises in FIGS. 4 and 5 the first and the second resilient parts 221 and 222. Consequently, the first and the second resilient parts 221 and 222 will collectively referred to depending on the circumstances as a second resilient hinge 22 merely for brevity of description.

In the illustrated example, the single plane of the first and the second resilient parts 221 and 222 is parallel to the first resilient hinge 21 in the rest state of the piezoelectric actuator 17. The first and the second resilient hinges 21 and 22 are made of a resilient metal sheet, such as a maraging steel sheet, which is typcially 0.15 mm thick. For the above-described dimensions of the piezoelectric actuator 17 and the arm 19, the first resilient hinge 21 is typically 2 mm wide. Each of the first and the second resilient parts 221 and 222 is typically 1.5 mm wide.

The first resilient hinge 21 has its one end centrally of the longest measure of the thick end block of the arm 19 and its other end on the free end of the piezoelectric actuator 17. The last-mentioned other end of the first resilient hinge 21 may be centrally of the actuator length, namely, the above-mentioned predetermined width of the piezoelectric actuator 17. The first and the second resilient parts 221 and 222 have their one ends on both ends of the longest measure of the thick end block and their other ends on the first and the second leg end surfaces of the base member 16. A space of only 1 mm is left between the block surface of the thick end block on the one hand and the free end and the leg end surfaces on the other hand. Exactly speaking, the predetermined spacing is a spacing between the adjacent or opposing surfaces of the first and the second resilient hinges 21 and 22.

Reviewing FIGS. 4 and 5, the printing hammer comprises the parts as follows. The piezoelectric actuator 17 has the base end, the free end, and the actuator axis. The resilient coupler 23 couples the base end to the base member 16. The arm 19 is disposed transversely of the actuator axis and has the thick end block at its first arm end placed near to the piezoelectric actuator 17. The first resilient hinge 21 couples the free end of the piezoelectric actuator 17 to the thick end block of the arm 19. The first and the second resilient parts 221 and 222 are used in coupling the thick end block to the base member 16. It is to be noted that the first and the second resilient parts 211 and 222 are on both sides of the first resilient hinge 21 and on a single plane which has a step of the above-mentioned predetermined spacing relative to the first resilient hinge 21 in a direction of the thickness of the first resilient hinge 21. The printing wire 26 is fixed to a second arm end of the arm 19 parallel to the actuator axis.

The printing hammer comprises only one lever like the conventional printing hammers illustrated with reference to FIGS. 1 and 2. The printing hammer is therefore compact, simple in structure, and inexpensive to manufacture.

Inasmuch as the first and the second resilient hinges 21 and 22 are attached to the arm 19 along the first and the second lines which the arm 19 has on only one side thereof, it is possible to reduce the energy loss and yet to adjacently dispose the fulcrum and the power point of the lever to make the lever have a great displacement amplification factor. Like in the conventional printing hammers described with reference to FIGS. 1 and 2, the arm 19 has a small equivalent mass. In FIGS. 4 and 5, this serves to additionally reduce the energy loss, allows the first and the second resilient hinges 21 and 22 to have a great flexural rigidity, and gives the printing hammer a high response frequency to the printing operation and consequently a high printing speed.

Incidentally, the resilient coupler 23 reduces the bending stress to which the piezoelectric actuator 17 is inevitably subjected during the actuated state. The printing hammer therefore has a high reliability and a long serviceable life.

On putting the printing hammer of the numerical example described above into operation, a voltage of 130 volts was applied across the electrodes, such as 18 (FIG. 1), to put the piezoelectric actuator 17 into the actuated state. In response, the free end moved 14 microns from the free end put in the rest state. The printing wire 26 moved substantially parallel to the actuator axis 300 microns statically and 500 microns dynamically. The output energy was about a half of the input energy or more.

Turning to FIG. 6, the description will proceed to a printing hammer according to a second embodiment of this invention. The printing hammer is similar in structure to that illustrated with reference to FIGS. 4 and 5 and comprises similar parts which are designated by like reference numerals and are operable as in FIGS. 4 and 5. The base end of the piezoelectric actuator is, however, directly fixed in FIG. 6 to the base member 16. In other words, the above-described coupling means is for coupling the base end directly to the base member 16.

Inasmuch as the base end of the piezoelectric actuator 17 is directly fixed to the base member 16, the printing hammer has a high natural frequency than that illustrated with reference to FIGS. 4 and 5. The printing hammer is therefore preferred when it is desired to raise the printing speed even at the cost of the high reliability and the long life.

Further turning to FIGS. 7 and 8, a printer head comprises a plurality of printing hammers, such as twenty-four printing hammers, of the type illustrated with reference to FIG. 6. The printer head comprises a casing comprising, in turn, a hollow cylindrical part 31 which has a cylinder axis and is shared by the printing hammers as the base member 16 described in conjunction with FIG. 4 for each printing hammer. A tapered hollow rectangular column 32 is extended upwardly in the figure from the cylindrical part 31 and has a top guide 33 and an intermediate guide 34 in the manner known in the art.

The printing hammers are arranged in the cylindrical part 31 radially around the cylindrical axis with the printing wire 26 of each printing hammer extended through the intermediate guide 34 to partly appear upwardly of the top guide 33 in the known manner. It will be readily possible to make the cylindrical part 31 have pairs of the above-described side legs for the printing hammers, respectively. In FIGS. 7 and 8, each printing hammer may be of the type of FIGS. 4 and 5.

Figure 10:
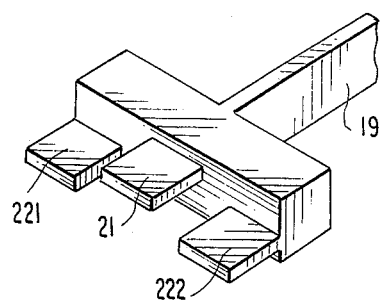
FIG. 10 is a schematic perspective view of a part of the printing hammer depicted in FIG. 9.

Referring now to FIGS. 9 and 10, the description will be directed to a printing hammer according to a third embodiment of this invention. The printing hammer comprises similar parts which are designated by like reference numerals and are operable as described in connection with FIGS. 4 and 5.

In the manner best shown in FIG. 9, the base end of the piezoelectric actuator 17 is fixed directly to the base member 16. The arm 19 is extended substantially along the actuator axis when the piezoelectric actuator 17 is in the rest state. The printing wire 26 is fixed to the arm 19 at the end point substantially perpendicularly of the arm length described above. The printing wire 26 may form either an actute angle or an obtuse angle with the arm length.

Reviewing FIGS. 9 and 10, it is possible to understand that the printing hammer comprises the parts as follows. The arm 19 has the end point to which the printing wire 26 is fixed so as to be movable in a printing direction when the arm 19 is moved in the manner known in the art. The arm 19 has the arm thickness perpendicularly of the printing direction and another end which may be named a thick end. The first resilient hinge 21 has a width perpendicular to the printing direction and a first end fixed to a central part of the thick end. The piezoelectric actuator 17 has the base end fixed directly to the base member 16 and the free end fixed to a second end of the first resilient hinge 21. The first and the second resilient parts 221 and 222 are disposed on both widthwise sides of the first resilient hinge 21 with a step of the afore-described predetermined spacing relative to the first resilient hinge 21 in the printing direction. The first and the second resilient parts 221 and 222 have their respective first ends fixed to the thick end and their second ends fixed to the base member 16.

Figure 11:
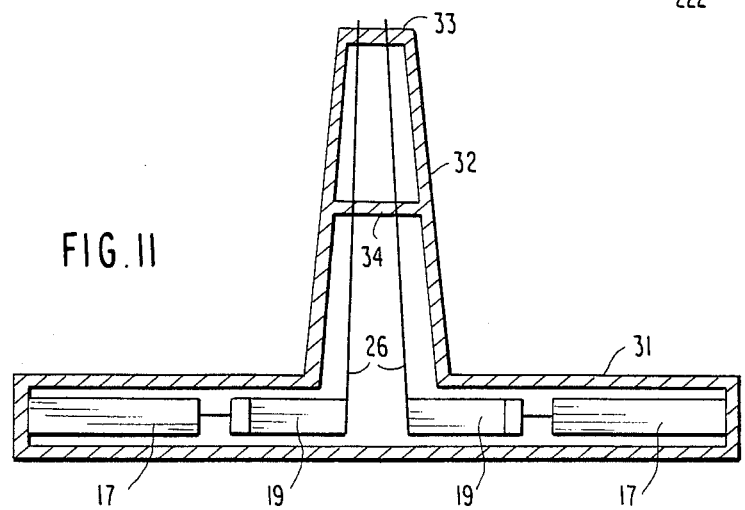
FIG. 11 is a schematic vertical sectional view of a printer head which comprises a plurality of printing hammers illustrated in FIG. 9.

Turning to FIG. 11, a printer head is similar in structure to that illustrated with reference to FIGS. 7 and 8 and comprises similar parts designated by like reference numerals. In FIG. 11, the printer head comprises a plurality of printing hammers of the type of FIGS. 9 and 10. When compared with the printer head depicted in FIGS. 7 and 8, the printer head is thin or has a small height in FIG. 11 although the printer head is wide or has a great diameter.

Figure 12:
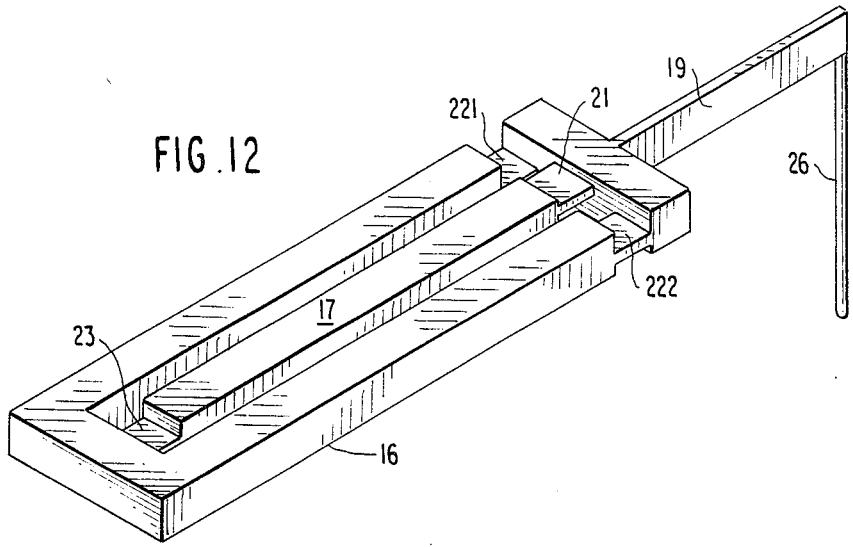
FIG. 12 is a schematic perspective view of a printing hammer according to a fourth embodiment of this invention.

Further turning to FIG. 12, the description will be directed to a printing hammer according to a fourth embodiment of this invention. The printing hammer comprises similar parts which are designated by like reference numerals and are operable in the manner described in connection with FIGS. 9 and 10. It is to be noted in FIG. 12 that the base end of the piezoelectric actuator 17 is not directly fixed to the base member 16 but indirectly by the use of the resilient coupler 23.

The printing hammer is preferred when it is desired to attain a high reliability and a long workable life even at the expense of the printing speed. Incidentally, it will be obvious that a printer head may comprise a plurality of printing hammers of the type illustrated with reference to FIG. 12.

Reviewing FIGS. 4 through 6, 9, 10, and 12, it will be understood that the arm 19 has a complicated shape at the thick end portion from which the first and the second resilient hinges 21 and 22 are extended to the free end of the piezoelectric actuator 17 and to the leg end surfaces of the base member 16. It is therefore desirable to resort to the electron discharge machining known in the art on manufacturing the first resilient hinge 21 and the first and the second resilient parts 221 and 222 together with the thick end block or with the metal actuator block of the piezoelectric actuator 17 and the side leg pair of the base member 16. Even with the electron discharge machining, the printing hammer is of a poor productivity and costly to manufacture.

Figure 14:
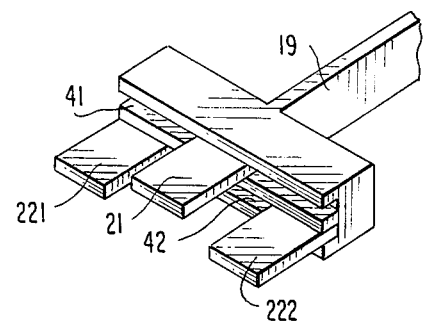
FIG. 14 is a schematic perspective view of a part of the printing hammer shown in FIG. 13.
Figure 13:
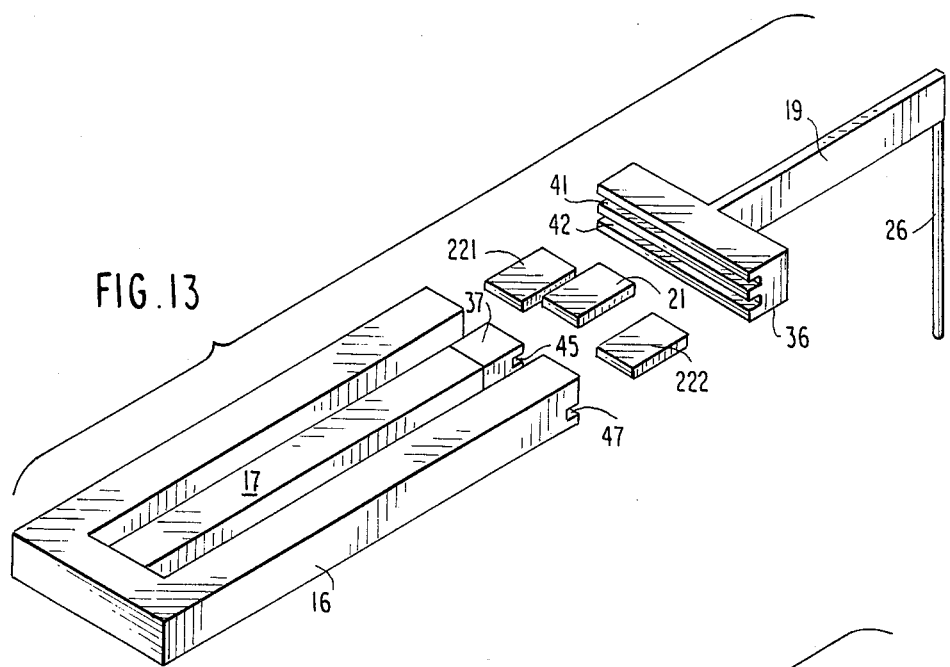
FIG. 13 is an exploded schematic perspective view of a printing hammer according to a fifth embodiment of this invention.

Referring now to FIGS. 13 and 14, the description will be directed to a printing hammer according to a fifth embodiment of this invention. The printing hammer is similar in structure to that depicted in FIGS. 9 and 10 and comprises similar parts designated by like reference numerals.

Attention will be directed in FIGS. 13 and 14 to the thick end block of the arm 19, to the actuator block of the piezoelectric actuator 17, and to the first and the second leg end surfaces of the base member 16. The thick end block will hereafter be called a first coupling member or part 36. The actuator block will be named a second coupling member or part 37.

The base member 16 comprises a base portion which is depicted leftmost of the figure and to which the base end of the piezoelectric actuator 17 is directly fixed in the example being illustrated. The above-mentioned side legs of the base member 16 are extended parallel from the base portion and have the first and the second leg end surfaces. The piezoelectric actuator 17 comprises the piezoelectric element described in conjunction with FIGS. 4 and 5 and the second coupling member 37. The piezoelectric element has the base end, the actuator axis, and an opposite end which is opposite to the base end and is perpendicular to the actuator axis. The second coupling member 37 is fixed to the opposite end and has a free end which serves as the free end of the piezoelectric actuator 17. The arm 19 comprises an arm body having the end point and a body end opposite to the end point. The first coupling member 36 is fixed to the body end and has the first and the second lines on the block surface described before.

First and second member grooves 41 and 42 are formed into the first coupling member 36 from the block surface along the first and the second lines. A single member groove 45 is formed into the second coupling member 37 from the free end parallel to the above-mentioned actuator width substantially centrally of the actuator length. First and second leg grooves 46 and 47 are formed into the side legs from the first and the second leg end surfaces parallel to the base portion of the base member 16. It is to be noted that the first leg groove 46 is not visible in the figure. More exactly, the grooves 41, 42, and 45 through 47 should be placed in the manner which will shortly become clear. Each groove should have a width capable of snugly receiving the metal sheet of the thickness of 0.15 mm and may have a depth of 1 mm. Such grooves are formed by usual machining.

The first resilient hinge 21 and the first and the second resilient parts 221 and 222 are now manufactured by punching the resilient metal sheet. The first resilient hinge 41 has its first end put centrally of the first member groove 41 and brazed to the first coupling member 36 and its second end put into the single member groove 45 and brazed. The first and the second resilient parts 221 and 222 have their respective first ends put into both end portions of the second member groove 42 and brazed and their second ends put into the first and the second leg grooves 46 and 47 and brazed. On resorting to the brazing, the base member 16 is preferably made of an iron-nickel alloy which usually includes manganese and known as Invar. The actuator block 37 should be attached to the piezoelectric element in the known manner after completion of the brazing.

It is now appreciated that the printing hammer has an excellent productivity and is less expensive to manufacture than the printing hammers illustrated with reference to FIGS. 4 through 6, 9, 10, and 12. If desired, the base end of the piezoelectric actuator 17 may be coupled to the base portion of the base member 16 by the resilient coupler 23 (FIG. 4 or 12). It is possible to manufacture a printer head by using a plurality of printing hammers of the type illustrated with reference to FIGS. 13 and 14.

Reviewing FIGS. 13 and 14, the printing hammer comprises the parts as follows. The arm 19 has the end point and the body end at which the printing wire 26 and the first coupling part 36 are fixed to the arm 19. The first resilient hinge 21 has its first end connected to the first coupling part 36 and its second end connected to the second coupling part 37. The first and the second resilient parts 221 and 222 are disposed on both widthwise sides of the first resilient hinge 21 with a step of the above-mentioned predetermined spacing relative to the first resilient hinge 21 in a direction of its thickness. The first and the second resilient parts 221 and 222 have their respective first ends connected to the first coupling part 36 and their second ends connected to the base member 16. The piezoelectric actuator 17 has the free end connected to the second coupling part 36 and the base end fixed to the base member 16.

In the printing hammer reviewed above, connection of the first resilient hinge 21 and the first and the second resilient parts 221 and 222 is carried out as follows to the first and the second coupling parts 36 and 37 and to the base member 16. Grooves are formed in the first and the second coupling parts 36 and 37 and in the base member 16. The ends of the first resilient hinge 21 and the first and the second resilient parts 221 and 222 are put into the grooves and brazed.

Figure 15:
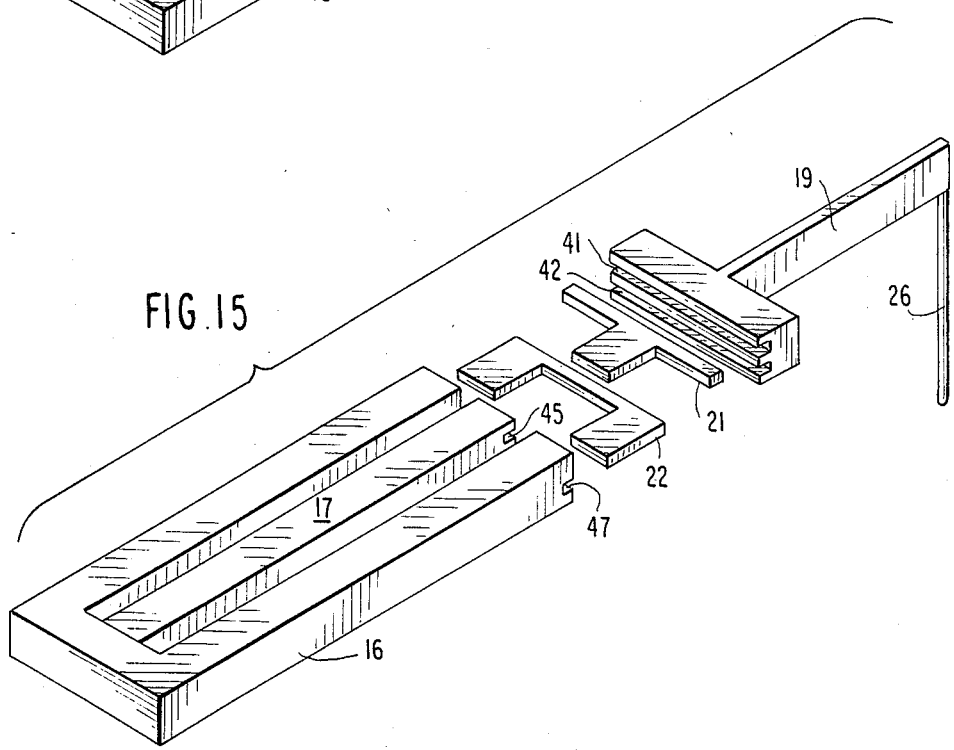
FIG. 15 is an exploded schematic perspective view of a printing hammer according to a sixth embodiment of this invention.

Turning to FIG. 15, the description will proceed finally to a printing hammer according to a sixth embodiment of this invention. The printing hammer is similar in structure to that illustrated with reference to FIGS. 13 and 14 and comprises similar parts designated by like reference numerals.

In FIG. 15 and also in FIGS. 13 and 14, the first and the second member grooves 41 and 42 of the first coupling member or part 36 have a common length. In FIG. 15, the first resilient hinge 21 is a T-formed member which comprises a base element or top portion as the top horizontal stroke of the T form and a single branch or trunk element as the vertical stroke. Merely for convenience of the discription which follows, the base element will hereinafter be termed a first base element. The first and the second resilient parts 221 and 222 are an integral member which is indicated at 22 (the reference numeral of the second resilient hinge being used) and which has an inversed U form comprising a second base element as a bottom (straight) stroke of the letter of U and first and second branch elements as left and right vertical strokes.

More specifically, the first base element has the common length and a width which is equal to the depth of the first member groove 41. The first base element serves as the first end of the first resilient hinge 21. The single branch element is extended perpendicularly from a central part of the first base element and has a free end which serves as the second end of the first resilient hinge 21. The second base element has the common length and a width equal to the depth of the second member groove 42 and serves as the first end of the first resilient part 221 and furthermore as the first end of the second resilient part 222. The first and the second branch elements are extended parallel from both end parts of the second base element and have free ends which serve as the second ends of the first and the second resilient parts 221 and 222.

It will now be appreciated that the printing hammer has a simpler structure than that illustrated with reference to FIGS. 13 and 14 and is likewise operable. The piezoelectric actuator 17 may be coupled to the base member 16 by using the resilient coupler 23 described above. A printer head may comprise a plurality of printing hammers of the type illustrated with reference to FIG. 15.

While this invention has thus far been described in specific conjunction with several preferred embodiments thereof, it will now be readily possible for one skilled in the art to carry this invention into effect in various other manners. Above all, it is possible to make the single plane of the first and the second resilient parts 221 and 222 form an acute angle, such as a few degrees, with the first resilient hinge 21.

What is claimed is:

1. In a printing hammer comprising a base member, a piezoelectric actuator having a base end, a free end, and an actuator axis passing through said base and said free ends and having a rest state and an actuated state of extending and contracting along said actuator axis, an arm having a first line, a second line parallel to said first line, and an end point, a printing wire fixed to said end point, coupling means for coupling said base end to said base member, a first resilient hinge coupling said free end to said first line, and a second resilient hinge coupling said second line to said base member, the improvement wherein said second resilient hinge comprises a first and a second resilient part which couple said second line to said base member on both sides of said first resilient hinge and which are on a single plane when said piezoelectric actuator is in said rest state.

2. A printing hammer as claimed in claim 1, said piezoelectric actuator having a predetermined width perpendicularly of said first and said second lines, wherein said arm has said first and said second lines having a predetermined spacing therebetween, said predetermined spacing being not greater than about a half of said predetermined width.

3. A printing hammer as claimed in claim 2, wherein said printing wire is fixed to said end point parallel to said actuator axis when said piezoelectric actuator is in said rest state, said printing wire having a wire axis offset relative to said actuator axis.

4. A printing hammer as claimed in claim 3, wherein said coupling means comprises a resilient coupler coupling said base end to said base member.

5. A printing hammer as claimed in claim 3, wherein said coupling means is for fixing said base end directly to said base member.

6. A printing hammer as claimed in claim 2, wherein said arm is extended substantially along said actuator axis when said piezoelectric actuator is in said rest state, said printing wire being fixed to said end point transversely of said arm.

7. A printing hammer as claimed in claim 6, wherein said coupling means is for fixing said base end directly to said base member.

8. A printing hammer as claimed in claim 6, wherein said coupling means comprises a resilient coupler coupling said base end to said base member.

9. A printing hammer as claimed in claim 2, wherein said arm comprises an arm body having said end point and a body end and a first coupling member which is fixed to said body end and has said first and said second lines and into which a first and a second member grooves are formed along said first and said second lines, said piezoelectric actuator comprising a piezoelectric element having said base end, said actuator axis, and an opposite end opposite to said base end and perpendicular to said actuator axis and a second coupling member which is fixed to said opposite end and has said free end and into which a single member groove is formed from said free end, said base member comprising a base portion and a pair of side legs which are extended parallel from said base portion to have a first and a second leg end surface and into which a first and a second leg groove are formed from said first and said second leg end surfaces, respectively, said first resilient hinge having its first end put in said first member groove and brazed and its second end put in said single member groove and brazed, said first and said second resilient parts having their first ends put in said second member groove and brazed and their second ends put in said first and said second leg grooves and brazed.

10. A printing hammer as claimed in claim 9, wherein said coupling means is for fixing said base end directly to said base portion.

11. A printing hammer as claimed in claim 9, wherein said coupling means comprises a resilient coupler coupling said base end to said base portion.

12. A printing hammer as claimed in claim 9, said first and said second member grooves having a common length, wherein said first resilient hinge is a T-formed member which consists of a first base element having said common length and a single branch element extended from a central part of said first base element and having a free end serving as the second end of said first resilient hinge, said first and said second resilient parts being an integral U-formed member which consists of a second base element having said common length and serving as the first ends of said first and said second resilient parts and first and second branch elements extended parallel from both end parts of said second base element and having free ends serving as the second ends of said first and said second resilient parts.

13. A printing hammer as claimed in claim 12, wherein said coupling means is for fixing said base end directly to said base portion.

14. A printing hammer as claimed in claim 12, wherein said coupling means comprises a resilient coupler coupling said base end to said base portion.

* * * * *

UNITED STATES PATENT AND TRADEMARK OFFICE
CERTIFICATE OF CORRECTION

PATENT NO. : 4,886,382

DATED : December 12, 1989

INVENTOR(S) : Oota et al

It is certified that error appears in the above-identified patent and that said Letters Patent is hereby corrected as shown below:

Column 4, line 8,   delete "hammer" and insert --manner--;

Column 7, line 39,  delete "22" and insert --222--; and

Column 8, line 20,  delete "211" and insert --221--.

Signed and Sealed this

Eleventh Day of December, 1990

*Attest:*

HARRY F. MANBECK, JR.

*Attesting Officer*     *Commissioner of Patents and Trademarks*